Patented Aug. 22, 1944

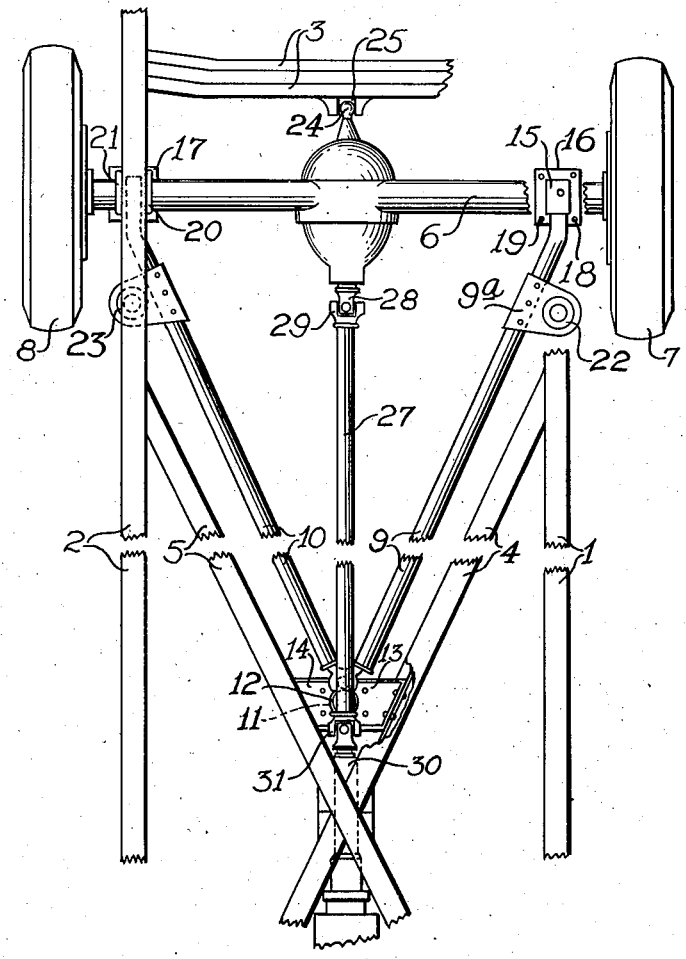

2,356,606

UNITED STATES PATENT OFFICE 2,356,606

VEHICLE SPRINGING

Josef Müller, Stuttgart, Germany; vested in the Alien Property Custodian

Application September 12, 1939, Serial No. 294,520
In Germany September 13, 1938

8 Claims. (Cl. 267—20)

This invention relates to the springing of a rigid axle, more particularly the rear axle of a motor vehicle, which is supported with reference to the frame by a strut or radius rod arrangement in such manner that it can pivot with respect to the frame against the action of helical springs, not only about a central longitudinal axis but also about a transverse axis determined by the pivotal attachment of the strut or radius rod arrangement to the frame.

In the known springing arrangements, the springs constructed as displacement springs, e. g. helical springs were arranged exclusively or at least in part on the side of the axle remote from the point of pivotal attachment of the struts or radius rods to the frame. In contradistinction thereto the invention provides such an arrangement of the helical springs—more particularly a single spring for each wheel side—that they are disposed exclusively on the same side of the straight line passing through the centres of the wheels as the point of pivotal attachment of the strut arrangement to the frame, and preferably they are disposed close to the wheels.

Such an arrangement has the important advantage—apart from the structural advantage that the space on the other side of the axle is not occupied by the helical springs and consequently can be used for other purposes—that the springing can be adapted to desired circumstances in a particularly effective manner, above all in such manner that the vehicle has an increased stability on curves.

Figure 1:
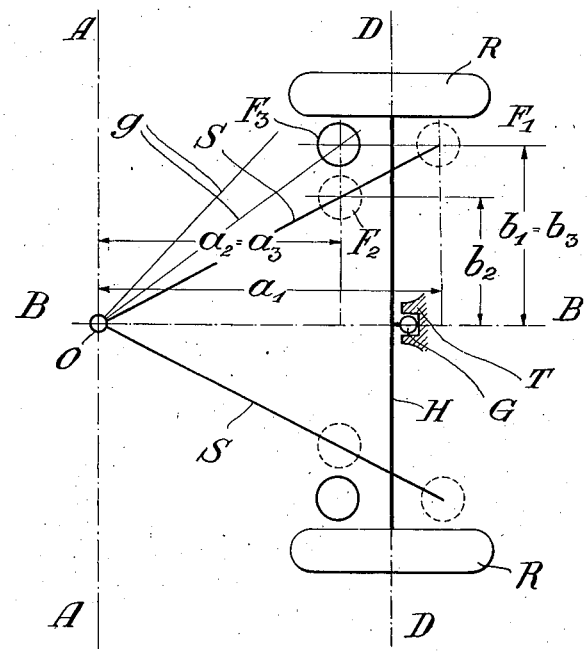
Figure 2:
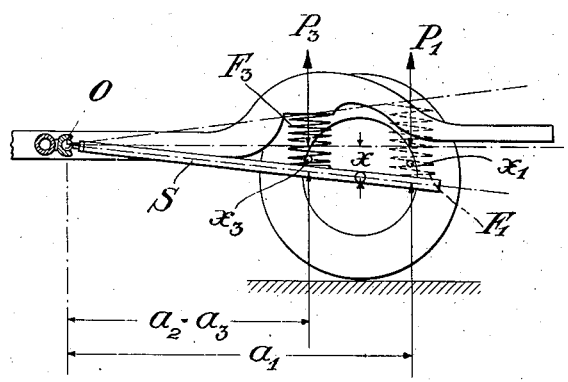

In the annexed drawings, the rear axle of a motor vehicle is shown diagrammatically in plan view in Figure 1 and in side view in Figure 2.

Fig. 3 is a plan view of the rear end of a motor vehicle chassis to which the invention has been applied, parts being broken away.

The road wheels R are arranged on a rear axle H which is supported forwardly with respect to the frame by means of struts or radius rods S which are connected with the axle, to form a triangle for example. The strut arrangement is pivotally connected to the frame by a ball joint O. Further the axle can be supported against lateral displacement relatively to the frame, in that for example the axle is guided by a joint G guided vertically with respect to the frame. This guidance may be effected by elastic rollers travelling in a vertical guideway arranged in the longitudinal central plane of the vehicle, or by a pair of links or similar means, in such manner that the axle can execute simultaneously an up and down movement about the axis A—A and a pivotal movement about a central longitudinal axis B—B. The springing is effected by helical springs in the example illustrated. For comparison purposes, spring positions in accordance with the invention are shown at $F_2$, or $F_3$, and a known spring position is shown at $F_1$.

With similarly directed equal displacements of the wheels about the axis A—A, any spring F or its spring power P will exercise against pivotal movement of the axle a restoring moment $$M_A = P \cdot a$$

which is assumed to be the same in all cases for the same displacement of the wheel. Thus $$M_A = P_1 \cdot a_1 = P_2 \cdot a_2 = P_3 \cdot a_3$$

As $$P_2 = P_3 = \frac{a_1}{a_2} \cdot P_1$$

and (for a wheel displacement $x$)

$$x_2 = x_3 = \frac{a_2}{a_1} \cdot x_1$$

there results for the spring $F_1$ a stiffness $$f_1 = \frac{P_1}{x_1}$$

and for the springs $F_2$ and $F_3$, a stiffness $$f_2 = f_3 = \frac{P_2}{x_2} = \frac{P_3}{x_3} = \left(\frac{a_1}{a_2}\right)^2 \cdot f_1$$

Thus with the same restoring moment with respect to the transverse axis A—A, the spring stiffness is inversely proportional to the square of the distance of the spring from this transverse axis. For restoring moments about the longitudinal axis B—B, which for example come into consideration for tilting of the vehicle body on curves, the following values are obtained:

(1) For the spring $F_1$, a restoring moment $$M_{B_1} = P_1 \cdot b_1$$

(2) For the spring $F_2$, a restoring moment $$M_{B_2} = P_2 \cdot b_2$$

or as $$P_2 = \frac{a_1}{a_2} P_1$$

and $$b_2 = \frac{a_2}{a_1} \cdot b_1$$

$$M_{B_2} = P_1 \cdot b_1 = M_{B_1}$$

i. e. all springs arranged on the straight lines O—$F_1$ and giving the same restoring moment about the axis A—A also give the same restoring moment about the axis B—B; the spring $F_1$ can thus always be replaced by equivalent springs arranged on these straight lines (i. e. along the struts S in the case shown in the drawings).

(3) For the spring $F_3$ the following restoring moment is exerted about the axis B—B:

$$M_{B_3} = P_3^1 \cdot b_3 = P_3^1 \cdot b_1$$

As in this case the displacement of the springs $F_3$ and $F_1$ is the same, $$P_3^1 = \frac{a_1}{a_3} \cdot P_3 = \left(\frac{a_1}{a_3}\right)^2 \cdot P_1$$

Correspondingly $$M_{B_3} = \left(\frac{a_1}{a_3}\right)^2 \cdot P_1 \cdot b_1 = \left(\frac{a_1}{a_3}\right)^2 \cdot M_{B_1} = \frac{f_3}{f_1} \cdot M_{B_1}$$

Thus under the above conditions and with the springs arranged on a line parallel to the longitudinal axis B—B, the restoring moments of the springs about this longitudinal axis are proportional to the stiffness of the springs and thus inversely proportional to the squares of the distances of the springs from the transverse axis A—A.

If, for example, $a_3 = \frac{3}{4} a_1$, then with equal springing of both springs $F_1$ and $F_3$ with respect to obstacles encountered by a road wheel (restoring moment about the axis A—A), the stiffness on curves of the spring $F_3$ is $^{16}/_9$ i. e. almost twice as much as the stiffness on curves of the spring $F_1$.

In general, it follows therefrom that, assuming an equal restoring moment about the axis A—A, all springs arranged top left of the straight line O—$F_1$ will have a greater stiffness on curves the farther they are away from the straight line O—$F_1$, the points of equal stiffness on curves (i. e. equal restoring moment about the axis B—B) lying on straight lines which pass through the pivot point O and some of which are indicated at g for example. Similarly by arranging the springs (in Fig. 1) bottom right of the straight line O—$F_1$, the stiffness of the springs on curves will be smaller until the value of zero is reached when the springs are arranged on the straight line B—B itself.

Conversely instead of increasing the stiffness on curves with the same obstacle springing, the same arrangement of the helical springs can give a softer obstacle springing with the same stability on curves, the latter determining the choice of spring stiffness.

By the arrangement of the helical springs in accordance with the invention in such manner that they lie between the straight line D—D joining the centres of the wheels, and the point of attachment O of the strut arrangement or the transverse axis A—A passing through the point O, the stability on curves and the obstacle springing can be adapted to the desired conditions in a particularly effective way, an increased stability on curves being desired as a rule.

When there is combined movement, as when there is pivotal movement about the axis A—A as well as about the axis B—B, for example when one road wheel only is lifted, a springing is obtained which has the properties of both kinds of springing.

Thus, according to the predominance of one or the other mode of movement, a restoring moment will be exerted which approximates more or less to that about one or the other axis.

A practical embodiment of my invention is shown by way of example in Fig. 3. The vehicle frame has longitudinal side members 1 and 2, transverse members 3 and diagonal cross members 4 and 5.

The rigid rear axle housing 6 supports driven rear wheels 7 and 8, and its movement longitudinally of the vehicle is controlled by the struts 9 and 10 of a V-shaped radius member having a ball 11 at its apex, which is mounted in a socket 12 in a housing 13 carried by a bracket 14 between the cross members 4 and 5. The rear extremities of the struts 9 and 10 are rigidly connected to the underside of the axle housing 6 between seatings such as 15 and sole plates 16 and 17 at points adjacent the opposite ends of the axle housing 6, as by means of U-shaped clips 18, 19 and 20, 21.

The struts 9 and 10 carry laterally extending brackets 9a and 10a respectively forming supports for the bottoms of coil springs 22 and 23 arranged substantially in the positions of springs $F_3$ in the diagrammatic showing in Fig. 1. The tops of coil springs 22 and 23 respectively abut the longitudinal side frame members 1 and 2, which are curved upwardly in the manner shown in Fig. 2.

Proper movements of the rear axle housing under all conditions may be secured in any desired manner, as, for example, by connecting it, in addition to the struts 9 and 10, to the transverse members 3 of the frame, by an elastic roller 24 carried by the axle and movable in a vertical guideway 25 in the longitudinal central plane of the vehicle.

The drive to the rear axle is through the propeller shaft 27 which is connected to the rear axle drive shaft 28 through a universal joint 29 and to an extension 30 of the transmission driven shaft through a universal joint 31.

Although the invention has been described in connection with a specific embodiment, the principles involved are susceptible of numerous other applications which will readily occur to persons skilled in the art. The invention is, therefore, to be limited only as indicated by the scope of the appended claims.

I claim:

1. In a vehicle having a frame, in combination, a rigid axle, struts rigidly connected to said axle to form a wheel-supporting unit, means for pivoting said unit to said frame for movement about a central longitudinal axis, including means for pivoting said struts to said frame for movement of said unit about a transverse axis, and springs on opposite sides of said vehicle intermediate said unit and said frame, said springs forming the sole springing means intermediate said unit and said frame, and being positioned entirely on the same side of a straight line through the wheel centers as the pivotal connection of said struts to said frame, and the transverse distance between said springs being larger than the longitudinal distance between said springs and said transverse axis.

2. The combination according to claim 1, in which said springs are unguided helical springs.

3. In a vehicle having a frame, in combination, a rigid axle, a pair of struts rigidly interconnected at one end with one another and at their other ends to said axle to form with the latter a triangular wheel-supporting unit, first pivot means at the juncture of the two struts, and second pivot means at the center of said axle for pivotally connecting said unit to said frame about a central longitudinal axis, said second pivot means being so constructed as to also permit movement of said unit about a transverse axis through said first pivot means, and springs on opposite sides of said vehicle intermediate said unit and said frame, said springs forming the sole springing means intermediate said unit and said frame, and being positioned entirely on the same side of a straight line passing through the wheel centers as said first pivotal means, and the transverse distance between said springs being larger than the longitudinal distance between each spring and said transverse axis.

4. The combination according to claim 3, in which said frame is provided with upwardly stepped supporting surfaces and said springs are unguided helical springs bearing against said unit at one end and against said supporting surfaces at their other ends.

5. In a vehicle having a frame, in combination, a rigid axle, struts rigidly connected to said axle to form a wheel-supporting unit, means for pivoting said unit to said frame for movement about a central longitudinal axis, including means for pivoting said struts to said frame for movement of said unit about a transverse axis, and springs on opposite sides of said vehicle intermediate said unit and said frame, said springs forming the sole springing means intermediate said unit and said frame, and being positioned entirely on the same side of a straight line through the wheel centers as the pivotal connection of said struts to said frame, the longitudinal distance of each spring from said straight line to the wheel centers being at least equal to one-fifth of the longitudinal distance of each spring from said transverse axis, and the transverse distance of each spring from said longitudinal axis is at least equal to two-thirds of the longitudinal distance of each spring from said transverse axis.

6. In a vehicle having a frame, in combination, a rigid axle, struts rigidly connected to said axle to form a wheel-supporting unit, means for pivoting said unit to said frame for movement about a central longitudinal axis, including means for pivoting said struts to said frame for movement of said unit about a transverse axis, and springs on opposite sides of said vehicle intermediate said unit and said frame, said springs forming the sole springing means intermediate said unit and said frame, and being positioned entirely on the same side of a straight line through the wheel centers as the pivotal connection of said struts to said frame, and the transverse distance of each spring from said longitudinal axis being at least equal to two-thirds of the longitudinal distance of each spring from said transverse axis.

7. The combination according to claim 1, in which said springs are positioned outside of the struts.

8. The combination according to claim 3, in which said springs are positioned outside of the struts.

JOSEF MÜLLER.